United States Patent [19]
Gombos et al.

[11] Patent Number: 5,689,941
[45] Date of Patent: Nov. 25, 1997

[54] HIGH DENSITY COMBINATION DRY HAY AND HAYLAGE/SILAGE LIVESTOCK FEED-MAKING APPARTUS

[75] Inventors: John M. Gombos, Ellensburg, Wash.; Moshe Leashno, Long Beach, Calif.; James Alan Cooper, Rupert, Id.; Jeffrey Kay Cooper, Oakley, Id.; Lawrence Kay Cooper; Daniel Leroy Peterson, both of Burley, Id.

[73] Assignee: A.C.X. Trading, Inc., Ellensburg, Wash.

[21] Appl. No.: 595,017

[22] Filed: Jan. 31, 1996

Related U.S. Application Data

[62] Division of Ser. No. 250,796, May 27, 1994, abandoned.

[51] Int. Cl.$^6$ ................................................. B65B 1/24
[52] U.S. Cl. ................................................. 53/529; 53/513
[58] Field of Search .............................. 53/529, 438, 523, 53/530, 567, 576; 100/98, 207

[56] References Cited

U.S. PATENT DOCUMENTS

| | | |
|---|---|---|
| Re. 31,810 | 1/1985 | Lee . |
| 3,584,428 | 6/1971 | Falk . |
| 3,694,992 | 10/1972 | Hunt ................................ 53/438 |
| 3,818,955 | 6/1974 | Kline . |
| 3,968,619 | 7/1976 | Fishburne . |
| 4,002,004 | 1/1977 | Lambert ........................... 53/438 |
| 4,036,359 | 7/1977 | Strickland, Jr. ................. 53/529 |
| 4,055,931 | 11/1977 | Myers . |
| 4,162,603 | 7/1979 | Stromberg ....................... 53/438 |
| 4,310,036 | 1/1982 | Rasmussen et al. . |
| 4,337,805 | 7/1982 | Johnson et al. . |
| 4,343,131 | 8/1982 | McCormick et al. ........... 53/438 |
| 4,365,715 | 12/1982 | Egli . |
| 4,372,101 | 2/1983 | Fleissner ......................... 53/438 |
| 4,408,438 | 10/1983 | Rewitzer ......................... 53/438 |
| 4,424,051 | 1/1984 | Lee et al. . |
| 4,522,615 | 6/1985 | Bailen et al. . |
| 4,535,586 | 8/1985 | Eberle . |
| 4,867,736 | 9/1989 | Rasmussen et al. . |
| 5,159,877 | 11/1992 | Inman et al. . |
| 5,175,981 | 1/1993 | Gombos et al. ................. 53/529 |
| 5,220,772 | 6/1993 | Koskela et al. . |
| 5,343,670 | 9/1994 | Gombos et al. . |
| 5,392,591 | 2/1995 | Simpson . |
| 5,509,256 | 4/1996 | Groth .............................. 53/529 |
| 5,515,666 | 5/1996 | Berger et al. .................... 53/529 |

OTHER PUBLICATIONS

*Les machineries Verville*, brochure, Mar. 15, 1994.
Yearout, John, "Oregon grower does haylage in square bales," *Western Hay Magazine* (Sep./Oct. 1993), pp. 3–7 and cover page.

(List continued on next page.)

*Primary Examiner*—John Sipos
*Assistant Examiner*—Ed Tolan
*Attorney, Agent, or Firm*—Christie, Parker & Hale, LLP

[57] ABSTRACT

A compression apparatus for compressing livestock feed comprises a hopper for receiving the feed; a precompression assembly precompressing the feed; a first compression chamber coupled to the hopper to receive the precompressed feed therefrom; a first ram movable along a longitudinal axis of the first compression chamber and having a first pusher plate for pushing the precompressed feed along the longitudinal axis of the first compression chamber to produce a compressed block of mixed feed product; and a second, reduced volume compression chamber operatively connected to the first compression chamber at a distal end of the first compression chamber for receiving compressed feed pushed from the first compression chamber by the first pusher plate. The first pusher plate defines one side of the second compression chamber when the first ram is fully extended and the second compression chamber has an opening at one end thereof for discharging the compressed feed. A second ram, movable along a longitudinal axis of the second compression chamber, has a second pusher plate for pushing the compressed blocked of mixed feed product along the longitudinal axis of the second compression chamber.

1 Claim, 11 Drawing Sheets

OTHER PUBLICATIONS

Tilton, Lynn, "Lakin Milling: Pioneering in Horse Pellets," *Western Hay Magazine* (Jan./Feb. 1994), pp. 10–14.

Schwebach, Peggy, "Navajo Hay for Mexian Dairies," *Western Hay Magazine* (Jan./Feb. 1994), pp. 5, 6, 15–16.

"Haylage Frames & Bags," advertisement, Alberta Ag-Industries, Ltd., Manufacturer's Representative, Christmas Valley, Oregon 97641, *Western Hay Magazine*, Jan./Feb. 1994.

"Stinger Bale Transport," advertisement, Matlack Brothers Mfg., Haven, Kansas 67543, *Western Hay Magazine*, Jan./Feb. 1994.

Supreme International, Westaskiwin, Alberta, Canada, advertisement for supreme cutter mixer feeder with vertical mixing screw.

Gunderson, Scott, "Wisconsin dairymen 'up' the corn silage," *Hoard's Dairyman*, Nov. 1993, p. 800.

Nein, Robert, "TMR the easy way: They just buy it," *Hoard's Dairyman*, Nov. 1993, p. 815.

*Western Hay Magazine*, Mar./Apr. 1994, pp. 1–20.

Fersen, Paul C., "Super hay silage makes the difference," (circa 1992).

Watkins, Mike (Dr.), "More Miles of Milk Per Gallon of Feed," *California Agribusiness Dairyman*, Aug. 1992, pp. 18–19.

Xeroferm Laboratories, Inc. brochure.

"Bagging Eliminates a Lot of Problems," flyer, undated p. 5.

Chaffhaye product brochure (undated).

D.C. Church, *Livestock Feeds and Feeding*, 3rd edition, (1991) pp. 80–99).

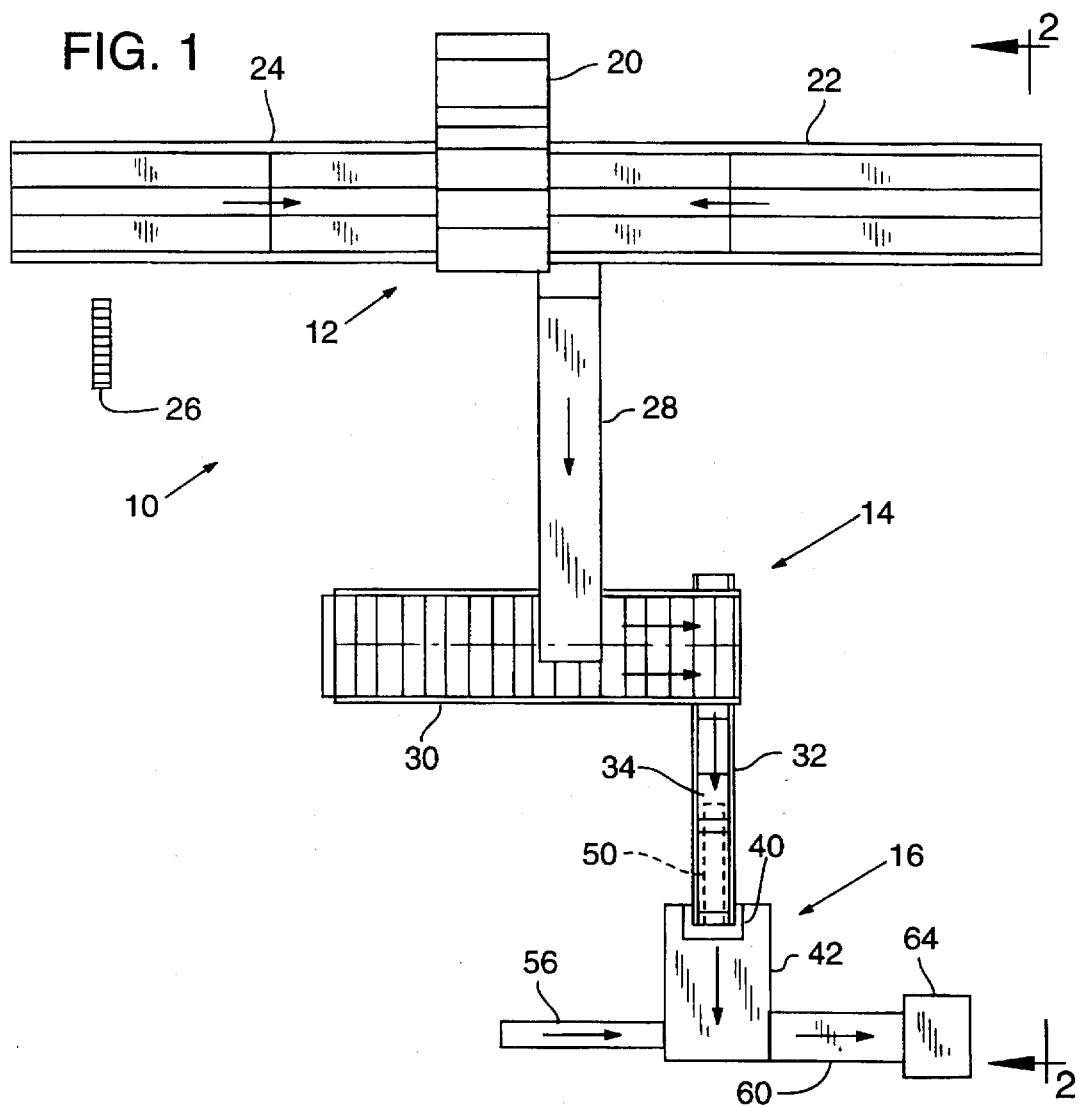
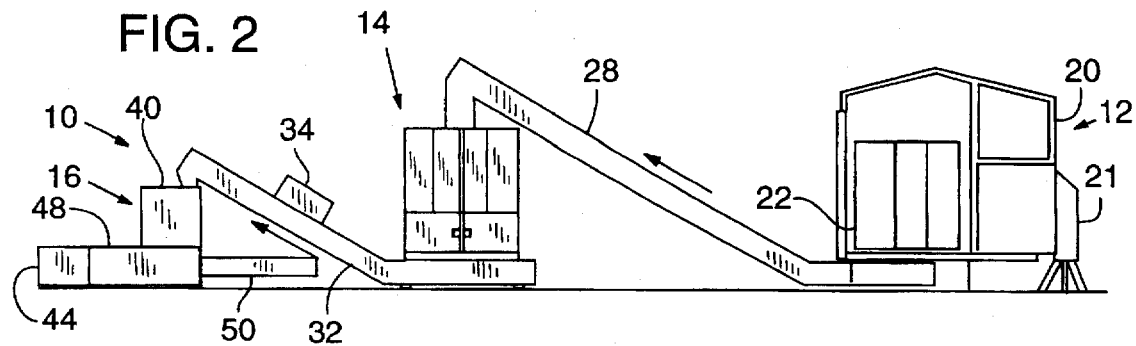

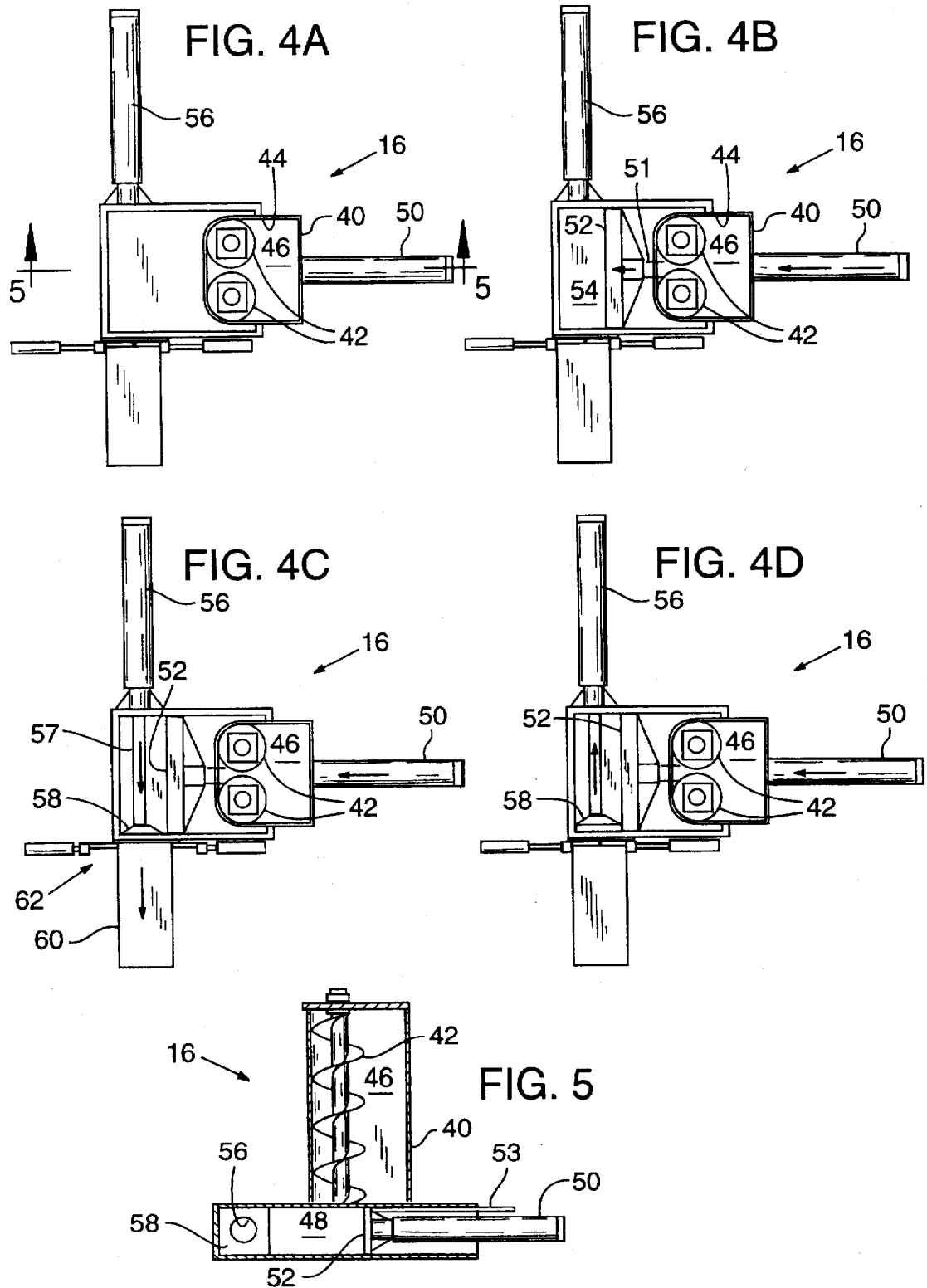

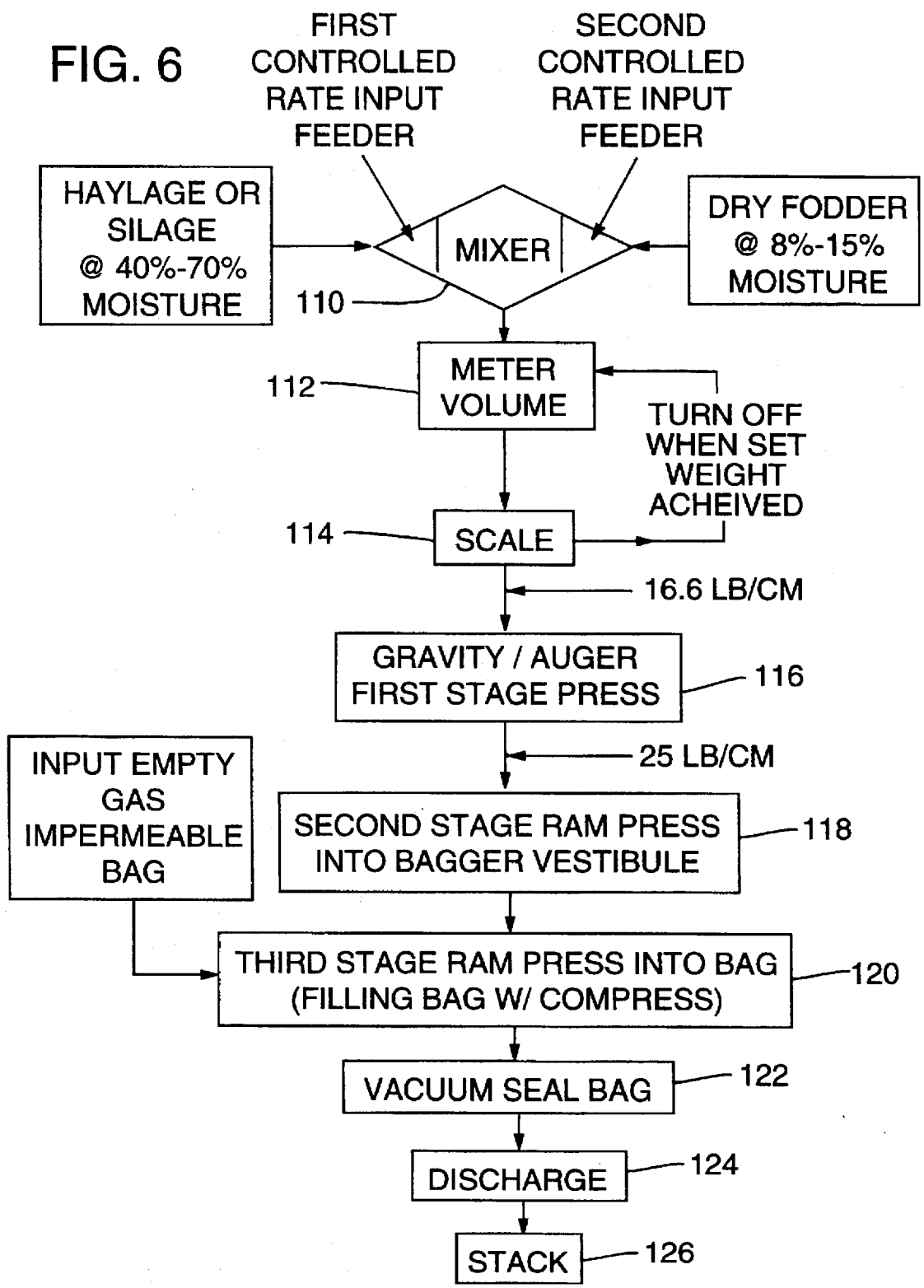

GATE CLOSED FOR FINAL COMPRESSION

GATE SHEARING OUT A SLUG OF PRE-COMPRESSED PRODUCT AS IT CLOSES

LOOSE PRODUCT IS PRE-COMPRESSED INTO THE CHAMBER THROUGH OPEN GATE
GATE OPEN

HIGH DENSITY COMBINATION DRY HAY AND HAYLAGE/SILAGE LIVESTOCK FEED-MAKING APPARTUS

RELATED APPLICATION DATA

This application is a divisional application of U.S. Ser. No. 08/250,796, filed May 27, 1994 now abandoned.

BACKGROUND OF THE INVENTION

The present invention pertains to the formulation, packaging and shipping of high density livestock feeds and more particularly to a high density livestock feed comprising fermented fodder, and a method and apparatus for packaging such feed for long distance shipping and handling with minimal spoilage.

Conventionally, livestock fodders have been packaged and stored in a number of different ways. One of the most common is in the form of hay, in which the fodder is cut and sun dried, and then is typically baled. Another common form of livestock feed is silage or haylage, in which feeds such as corn or alfalfa are cut, chopped and ensiloed in a high moisture condition so as to ferment. Another form of livestock feed is pellets or cubes of fodder that have been finely chopped and extruded—this form is preserved, stored and shipped in a dry state. Each form of feed has its own advantages and disadvantages.

For long distance shipping, especially overseas, preservability and economical shipability of livestock feed are critical issues. Historically, only dry feeds—hay and cubes or pellets—have met beth criteria. Pellets have a relatively high density, and preserve adequately as long as they are kept dry, but are expensive to produce. Baled hay is a somewhat less expensive form of feed, and stores and ships well as long as it is kept dry, but hay is also less dense so its relative shipping cost it higher than for pellets. In the last decade, however, it has become common for hay bales to be doubled compressed to increase shipping efficiencies. In particular, it has become commonplace to ship double-compressed baled hay from the United States to foreign countries that lack adequate feed production capacity, such as to Japan.

In order to be stored as hay, and even more importantly, for long distance shipping, the hay must be thoroughly dried. Otherwise, the hay can mold, mildew, oxidize and spoil, and can heat and possibly even ignite due to spontaneous combustion. For transoceanic shipping in enclosed cargo containers, the hay should have a moisture content of less than about 12%. Double compressed baled hay typically weighs in the range of 20 to 30 pounds per cubic foot.

Dried hay has several drawbacks. One drawback is that the curing process reduces the feed value of the hay, and the feed value continues to deteriorate gradually over time. Another drawback is that dry hay is not as palatable, nor as digestible, as fresh hay. Pellets and cubes are not any better in this regard.

Livestock fodders have also commonly been stored in the form of silage, such as chopped corn or sorghum, or haylage, which is wet chopped hay. For convenience hereinafter, this type of feed will be referred to collectively as silage, except where haylage is specified. The storage mechanism for silage is entirely different from that of dried hay. The fodder is ensiloed, that is, it is chopped and packed tightly into a silo or storage pit, plastic bag or other sealable container, and is preserved by fermentation. Silage-type feeds must be stored with a very high moisture content, over 40% and preferably around 60% water. Fermenting the chopped, wet fodder in an essentially air-free environment forms acids and alcohol which aid in preserving the silage.

Silage has several advantages over dry hay. First, the silage method of preserving the feed maintains a very high proportion of the initial nutrient value of the feed. Moreover, the ensiloed feed maintains a high nutrient content for a long period of time. Second, the silage is very palatable and very digestible by livestock. Because it is moist and tender, cattle can chew silage or haylage easily; the feed is very tasty; and it can be digested easily by cattle. Silage-type fodders are, therefore, a very desirable livestock feed, particularly for dairy and feedlot herds.

Silage-type feeds suffer, however, from two main disadvantages. One disadvantage is that, containing a very high percentage of water, such feeds are very heavy as well as bulky, and therefore uneconomical to transport over any significant distance. The other main disadvantage is that silage can spoil within a matter of hours when exposed to the air.

Some livestock feeders have tried blending silage or haylage with dry hay to improve the quality of the feed. Because the silage can quickly spoil, however, such blending is generally done where the blended feed product is to be consumed.

Heretofore, no techniques have been known for packaging and preserving silage-type feeds for economical shipment. The usual techniques that have been developed for preserving and packaging food stuffs, such as freezing, canning and vacuum packaging, are used for packaging the food stuffs in small quantities. They do not appear to be practical and are not known to applicants to have not been used for storing or shipping large bulk quantities of fermented livestock feeds.

One company, AgBag Corporation, has developed a system for ensiloing livestock feed in an elongated plastic bag as described in U.S. Pat. Nos. 4,424,051; 4,337,805; 4,310,036 and 4,308,901. The AgBag system appears to be limited to use on the farm, due to the large size, bulk and weight of the silage-filled storage bags, and not economical for long distance shipping. Also, due to the large size and bulk of the filled silage bags, it appears that handling of such containers without damage would be difficult. Also, it is unlikely that unloading machinery capable of handling such packages would be available at foreign ports.

As a result, notwithstanding the significant advantages of silage-type feeds over dried hay pellets and cubes, all transoceanic experts of livestock feeds known to applicants have been in the form of single or double compressed dry hay bales, or in the form of extruded, essentially dry pellets or cubes of hay or silage.

Accordingly, a need remains for a way to package and ship livestock feed which has more of the advantages of beth baled hay and silage and fewer of the disadvantages of each type of livestock feed.

SUMMARY OF THE INVENTION

One object of the invention, therefore, is to maximize the advantages of prior methods of feed storage and handling while minimizing the disadvantages.

Another object of the invention is to enable economical packaging and shipment of a more nutritious digestible form of livestock feed.

A further object is to enable a livestock feed comprising fermented silage to be packaged and preserved in a high density form suitable for long distance shipping without spoilage.

One aspect of the invention is a livestock cargo unit comprising a blend of dry hay or other fodder and moist haylage or silage intimately mixed together and highly compacted into a watertight bag. The blended dry fodder and haylage/silage feed product is mixed in a ratio that produces a net moisture in the range of 20%–35%, preferably within the range of 25%–30% and ideally at about 30% net moisture. This is approximately two and half times the moisture content of dry hay and about half of the usual moisture content of silage. The ratio of components in the blended feed product is preferably 62% by weight of typical dry fodder, such as dry baled hay of about 12% moisture, and 38% by weight of haylage or silage having a typical moisture content of about 60%, but precise proportions can be varied to control the net moisture percentage of the blended feed product. Optionally, vitamins minerals or other nutrients can be added to the blended dry fodder and haylage or silage.

The blended feed product is compressed into fixed volume units, which are packaged in durable airtight bags at a density of approximately 40 pounds per cubic foot. For ease of handling, a preferred size of bag is about 2.5 cubic feet, which contains about 100 pounds of blended feed product. The filled bag is preferably airtight, and is evacuated to remove as much oxygen as possible and thereby avoid oxidation of the feed. The vacuum should be a minimum of 10 inches of mercury, and desirably at least 20 inches of mercury and preferably 25 inches of mercury.

Alternatively, any oxygen remaining in the bag at the time of closure can be displaced by flashing back with a suitable inert gas, such as $CO_2$ or $N_2$, or a mixture of inert gases. A further alternative is to use a gas permeable bag to contain the compressed blend of forage materials and to stack a plurality of the filled closed bags in a larger airtight shipping container. The entire container is preferably evacuated but can also have the oxygen displaced therefrom by an inert gas.

A second aspect of the invention is a method for making the foregoing feed product. In the first step, dry fodder, typically previously-baled hay, having a moisture content of about 8% up to about 15%, is mixed with silage (and/or haylage) containing 40%–70% moisture in a ratio proportioned to produce a net moisture content in the mixed feed product that is the range of 20%–35%, preferably about 30%. The preferred proportions, for hay at 12% moisture and silage at 60% moisture, is 62% dry fodder to 38% silage. These components are mixed for a sufficient time to distribute the moisture content of the silage uniformly throughout the blended mixture. In production quantities in a batch process, this mixing requires a residence time in the mixer in the range of 10 to 20 minutes, typically about 15 minutes.

The feed mixture is then metered to a compression apparatus, which is preferably designed to provide a multi-stage compaction of the feed mixture. The feed mixture is input at a density of approximately 16.6 pounds per cubic foot. A first stage compression step, performed using either a gravity/auger system or a pre-compression ram, densities the feed product to a uniform density, e.g., about 25 pounds per cubic foot. A second compression stage, preferably implemented by means of a first hydraulic compression ram, further compresses a predetermined first volume of the uniform density feed mixture to a reduced, second volume. A third compaction stage uses a second hydraulic compression ram oriented at a right angle to the second stage ram, ejects and presses the blended highly compressed, feed product from the compressor. Preferably the feed is ejected at a density of about 40 pounds per cubic foot into a durable watertight and preferably airtight bag, thereby filling the bag with blended compressed hay/silage a density of about 40 pounds per cubic foot. The filled bag is then vacuumed sealed, discharged and stacked.

A further aspect of the invention is an apparatus for implementing the foregoing method. The apparatus comprises a mixer having two inputs, one for dry hay and the other for silage or haylage. The mixer is preferably a batch-type mixer having an output which discharges to a meter box that levels the flow of mixed feed product and relays the feed product to a compressing apparatus. The mixer can include a scale for weighing the material as it is blended in the mixer. The compressing apparatus can also include a scale. Controls responsive to these scales can be used to control the flow rate of material through the system, as well as the final weight of the bagged feed product. The inputs to the mixer are preferably in the form of a pair of floor drag conveyor portions. One of these portions, that used for inputting haylage or silage, can include an extruder to reduce the moisture content of the input haylage or silage. The compression apparatus preferably includes means for compressing the blended feed product in three stages. The first stage includes either a gravity feed auger system, or a pre-compression ram, which receives the blended feed product from the metro box and feeds it into a first hydraulic ram compression chamber. The first stage structure is designed and operated primarily to densify the blended feed product to a predetermined uniform density. The first chamber includes a first hydraulic compression ram that is oriented to operate in a horizontal direction to compress a fixed volume of the feed product input from first stage structure into a reduced volume in a second ram compression chamber. The second compression chamber and includes a hydraulic ram oriented horizontally at a right angle to the first hydraulic ram. In this section the compressed feed is moved laterally of the first ram to be ejected into a bagging apparatus. The bagging apparatus includes a bag closure mechanism and evacuation apparatus for evacuating the bag as it is being sealed.

The invention solves a number of problems in the prior art. It provides a very palatable, digestible and nutritious blended feed product. The haylage or silage moistens the dry fodder to make it more palatable and digestible, and contributes a high nutrient value to the blended product. The dry fodder reduces the moisture content of the overall blend of feed product, and increases the overall net feed content on a per gross ton basis well above that provided by conventional haylage or silage. At 40 pounds per cubic foot and 30% moisture content, the total dry matter content per cubic foot rivals that of the dense, double compressed hay (typically 22 pounds per cubic foot and 12% moisture content), making it economical to ship as well as a more desirable feed product. Packaging the blended feed product in a highly compacted condition, with a relatively high moisture content contributed by the silage, and little, if any, residual oxygen, minimizes oxidation and avoids spoilage and heating of the feed product.

An important advantage of the invention is that it retains a relatively long-fiber length in the feed product. In contrast, cubing dry hay reduces the fiber length of the hay to under 4 inches.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a top plan view of a system for blending, compacting and packaging dry hay and silage in accordance with the invention.

FIG. 2 is an elevation view taken along lines 2—2 in FIG. 1.

FIG. 4A is a top plan view of the press bagger of the system of FIG. 1 and FIGS. 4B–4D show progressive stages of operation of the press bagger.

FIG. 5 is a cross-sectional view taken along lines 5—5 in FIG. 4A.

FIG. 6 is a flow diagram of the process for blending, compacting and packaging dry hay and silage in accordance with the invention.

DETAILED DESCRIPTION

Figure 3A:
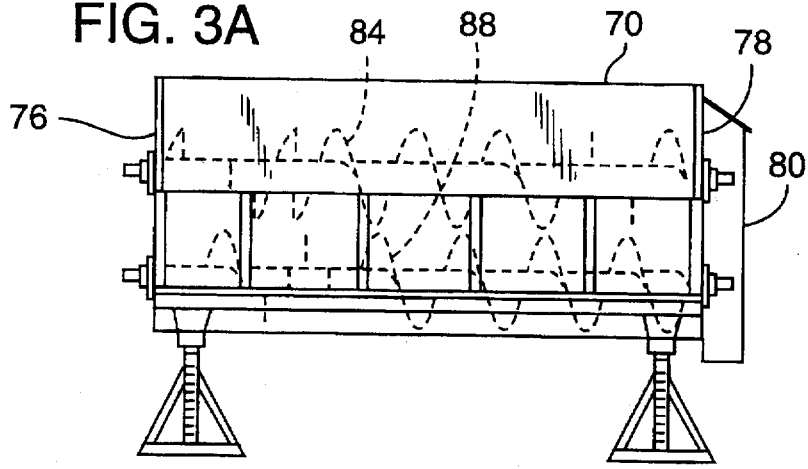
FIG. 3A is a side elevation view of the mixer 22, with interior auger details shown in dashed lines.
Figure 3B:
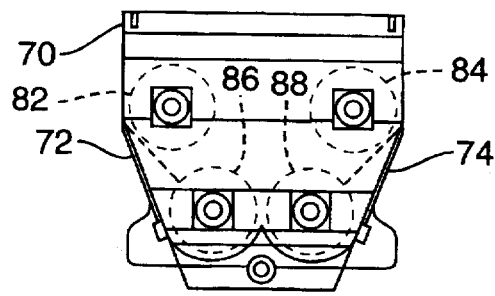
FIG. 3B is an end elevation view of the mixer of FIG. 3A, showing the axial arrangement of the augers in dashed lines.
Figure 3C:
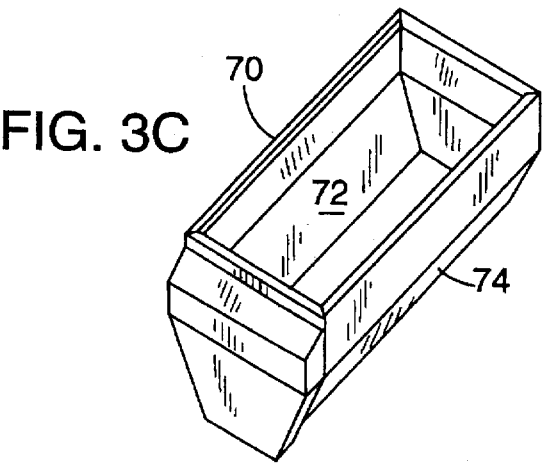
FIG. 3C is a perspective view of the mixing chamber of FIG. 3A.

FIGS. 1 and 2 show a preferred embodiment of a system 10 of apparatus for implementing the invention. The system 10 comprises hay/silage infeed and mixing apparatus 12, blended hay/silage flow leveling apparatus 14, and compression apparatus 16, together with interconnecting conveyors.

The mixing apparatus 12 comprises a mixer 20 having two input conveyors, a first conveyor 22 for infeeding dry hay and a second conveyor 24 for infeeding silage or haylage. Optionally, the second conveyor includes an extruder 26 for reducing the liquid content of the input silage before blending. The input conveyors 22, 24 are conventional horizontal floor drag-type conveyors. The illustrated mixer is a batch-type mixer supported on a scale 21 for weighing the input proportions of dry hay and silage as the mixer is filled. Alternatively, the mixer can be a continuous-type mixer and the input proportions of dry hay and silage can be metered by metering apparatus associated with the input conveyors.

Figure 3D:
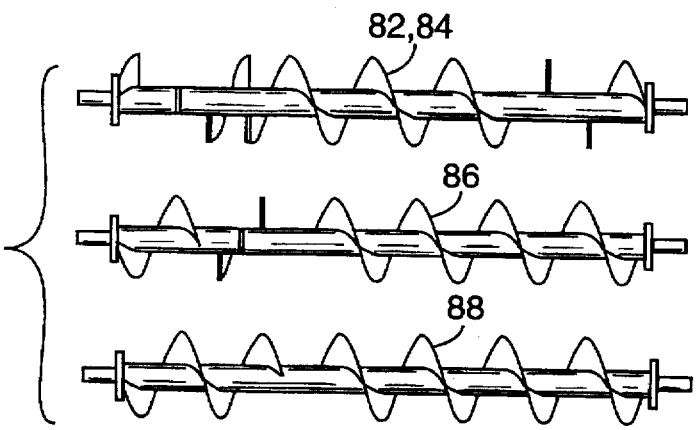
FIG. 3D are side elevation views of the different augers shown in the mixer of FIGS. 3A and 3B.

The preferred form of the mixer 20 is shown in FIGS. 3A–3D. The mixer includes a mixing chamber 70, better seen in FIG. 3C, having an open top, inwardly tapered sidewalls 72, 74 and parallel endwalls 76, 78. A drive housing 80 is mounted on one endwall. Two upper augers 82, 84 and two lower augers 86, 88 are journaled in the opposite endwalls 76, 78. The augers are driven by a drive assembly (not shown) in housing 80. The upper augers 82, 84 are spaced along upper portions of sidewalls 72, 74, respectively, and the lower augers 86, 88 are spaced close together at the bottom of mixing chamber 70. The augers are arranged as shown in FIG. 3D to accommodate the introduction of dry hay and silage from the infeed conveyors and to output mixed feed product from the discharge conveyor.

The mixer 20 has an output which discharges via a first transfer conveyor 28 to leveling apparatus 14 which includes a meter box 30. The transfer conveyor 28 is angled upward to discharge the blended feed product into the meter box 30 from above. The meter box 30 meters the blended feed product out to a second transfer conveyor 32. The second transfer conveyor includes a leveler 34 which levels the flow of mixed feed product before relaying the feed product to the compaction and bagging apparatus 16. The second transfer conveyor is otherwise similar to the first transfer conveyor.

The compression apparatus 16 receives the blended feed product and compresses it into a high density block which is then ejected to a bagging apparatus (not shown). The compression apparatus preferably includes apparatus for compressing the blended feed product in three stages, as shown in FIGS. 4A–4D. The first or precompression stage includes a gravity feed hopper 40 which receives the blended feed product discharged from the second transfer conveyor and a vertical auger system. The vertical auger system includes a pair of augers 42 positioned along one side of the hopper, providing a receiving space 44 for the blended feed product. The receiving space 44 has a width approximately equal to the diameter of the augers. The augers 42 rotate about parallel vertical axes to feed the hay/silage blend downward into a first hydraulic ram compression chamber 48.

The first compression chamber 48 includes a first hydraulic ram 50 that is oriented to operate in a horizontal direction. Mounted on an actuation rod 51 of ram 50 is a pusher plate 52. The chamber 48 and pusher plate 52 have a rectangular cross-sectional shape. When the ram is extended as shown in FIG. 4B, the pusher plate 52 sweeps the feed product laterally from beneath the augers 42 into a second, reduced volume compression chamber 54. This action further compresses the blended feed product. The pusher plate includes a top shield plate 53 extending rearward in chamber 48 to keep the augers from feeding more feed down behind the pusher plate when ram 50 is extended.

The second compression chamber 54 leads to the vestibule (not shown). A second hydraulic ram 56 is mounted at one end of chamber 54, oriented horizontally at a right angle to the first hydraulic ram.

This chamber is also rectangular and is swept by a rectangular or square pusher plate 58 mounted on the actuation rod 57 of ram 56. When ram 56 is extended, as shown in FIG. 4C, the compressed feed is moved laterally of the first ram into a bagging chamber 60, further described below. Pusher plate 52 serves to enclose one side of chamber 54 during this compression stage, until the pusher plate 58 is retracted, as shown in FIG. 4D. Then pusher plate 52 is retracted.

The bagging chamber 60 includes a gate mechanism 62 and sealing and evacuation apparatus 64 for evacuating the bag as it is being sealed.

The gate mechanism includes a pair of ram-actuated sliding gates 66, 68 which, when closed, form a sidewall of chamber 48 and an endwall of chamber 54. These gates are opened to permit the compressed feed product to be ejected via bagging chamber 60.

Figure 14:
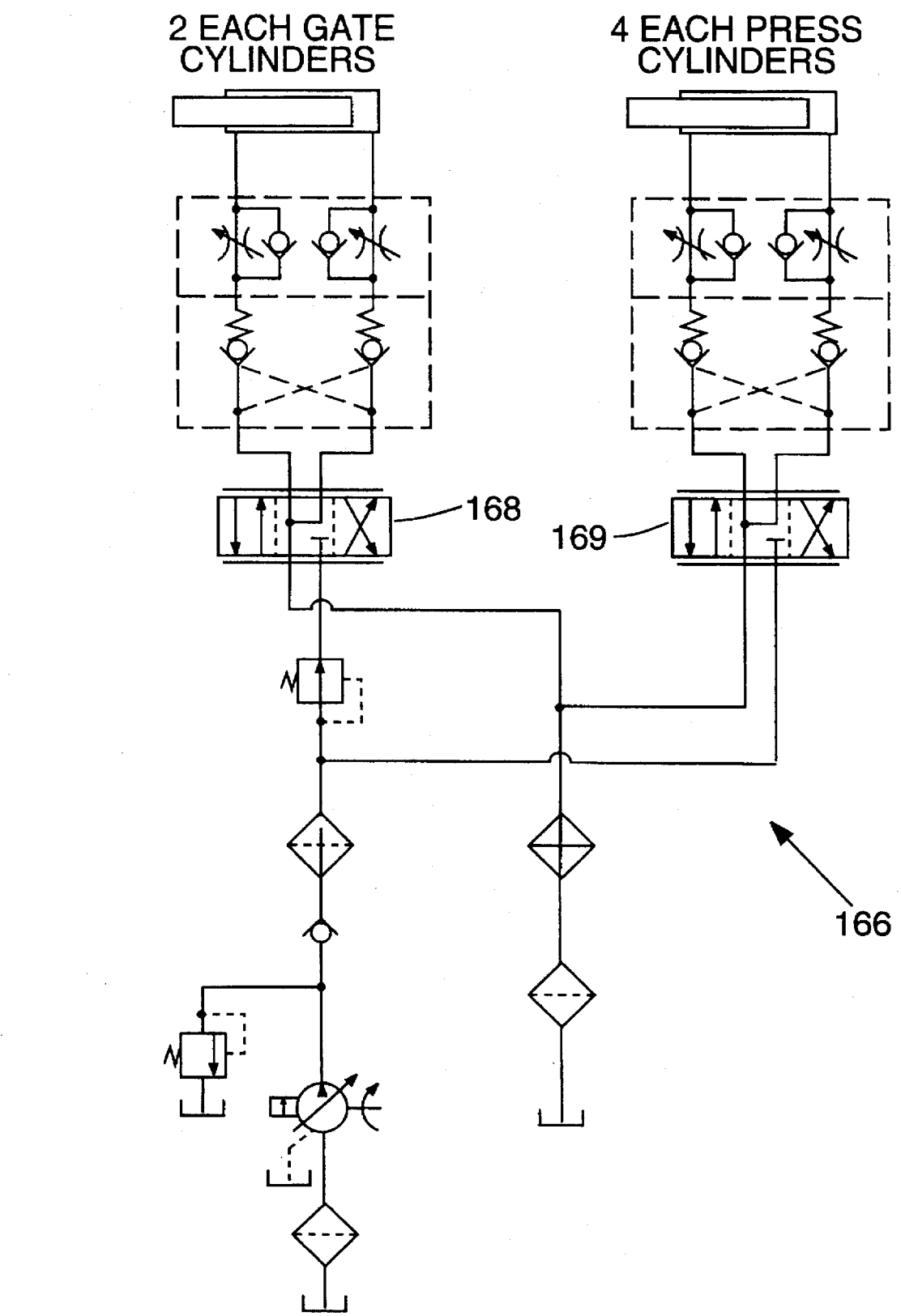
FIG. 14 is a schematic of hydraulic circuitry for actuation of the gate cylinders and press cylinders in the compression apparatus of FIGS. 8–13.

The compressor 16 can include a scale (not shown) and controls responsive to these scales, for controlling the flow rate of material through the system, as well as the final weight of the bagged feed product. These controls also sequence the compression and bagging steps described above. An example of the hydraulics control circuitry is shown in FIG. 14.

FIG. 6 is a flow diagram of the blending, compression and bagging process implemented in the above-described apparatus for making the blended hay/silage feed product of the invention. In a first step 110, dry fodder, typically previously-baled hay, is mixed with silage (and/or haylage) in a ratio proportioned to produce a net moisture content in the mixed feed product that is the range of 20%–35%, preferably under 30% and more preferably about 25%. The moisture content of the input dry hay can be about 8% up to about 15% and the input silage can contain 40%–70% moisture. Preferably, the moisture content of the hay is about 12%, and that of the silage about 60%. At these preferred moisture contents, the mixing ratio 62% dry fodder to 38% silage will yield a mixed feed moisture of about 30%. These components are mixed for a sufficient time to distribute the moisture content of the silage uniformly throughout the blended mixture. In production quantities, this requires a residence time in the mixer in the range of 10 to 20 minutes, typically about 15 minutes.

The feed mixture is then metered into a compression apparatus. The metering step 112 includes a volumetrically constant metering of the blended feed product, which can be gated by a weight measurement indicated at step 114. A scale measures the weight of feed product as it accumulates in the compression apparatus, and turns off the infeed once a predetermined weight is achieved, e.g., about 100 pounds (45 kg.).

The compression apparatus is preferably designed to provide a multi-stage compaction of the feed mixture, as described above and as indicated in FIG. 6 by steps 116, 118, 120, but is not so limited in this process. The blended hay/silage feed mixture is input to the compression apparatus at a density of approximately 16.6 pounds per cubic foot and compressed to a density of 30–45 pounds per cubic foot, preferably about 40 pounds per cubic foot.

In the last stage of compression, shown as step 120, the compressed feed product is compacted into a watertight bag. In the preferred embodiment of the process shown in FIG. 6, this bag is also airtight. The filled bag is vacuum sealed in step 122, and then discharged and stacked in steps 124 and 126.

The filled airtight bag is evacuated in step 122 to remove as much oxygen as possible and thereby avoid oxidation of the feed. The vacuum should be a minimum of 10 inches of mercury, desirably at least 20 inches of mercury, and preferably 25 inches of mercury. Alternatively, any oxygen remaining in the bag at the time of closure can be displaced by flashing back with a suitable inert gas, such as $CO_2$ or $N_2$, or a mixture of inert gases.

Figure 7:
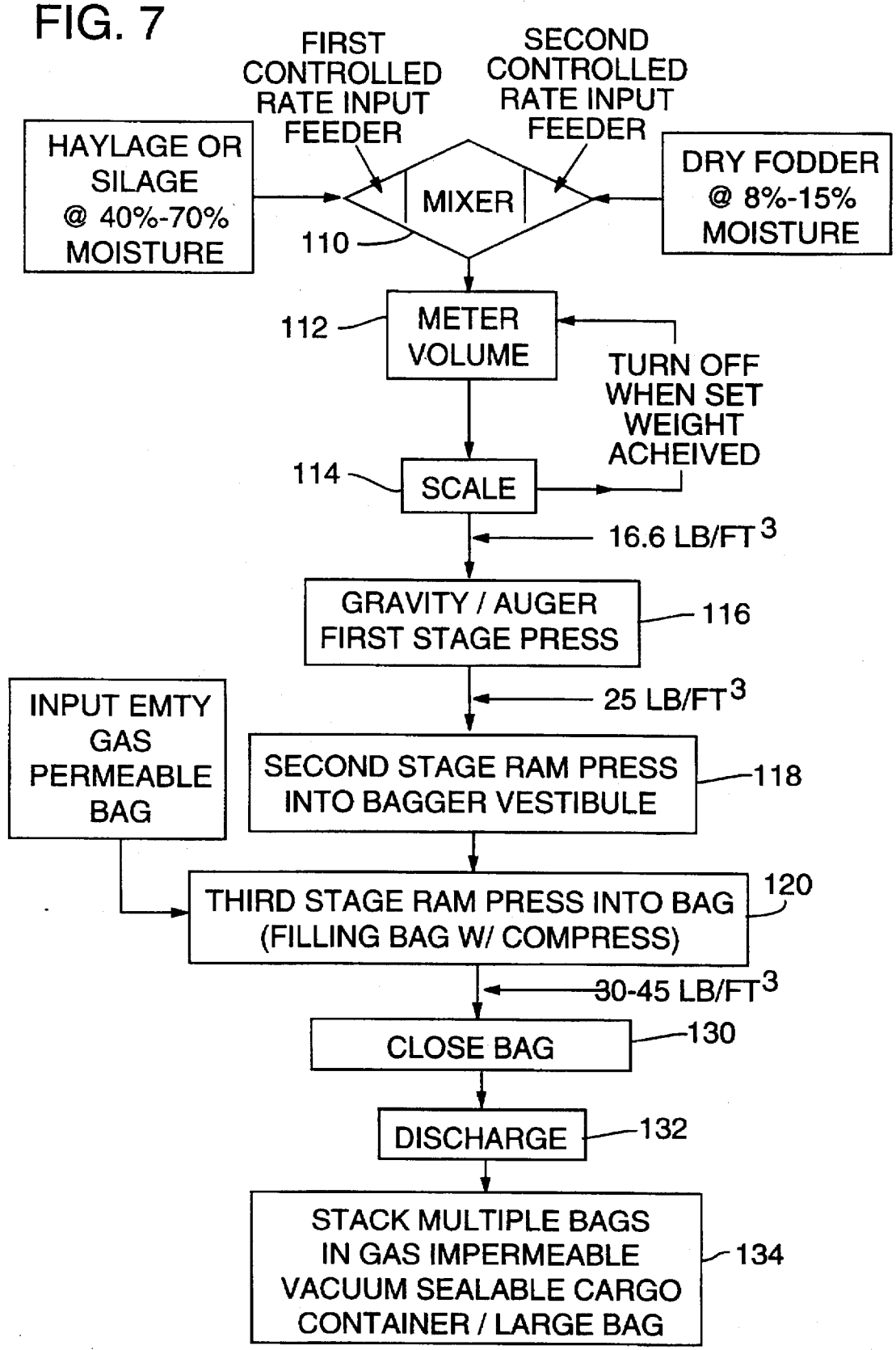
FIG. 7 is a flow diagram of an alternative embodiment of the process for blending, compacting and packaging dry hay and silage.

Referring to FIG. 7, steps 110 through 120 are identical to the same steps in FIG. 6, except that an airtight bag is not used and is not evacuated before sealing. This alternative embodiment uses a gas permeable bag to contain the compressed blend of forage materials. After filling, the bag is closed (step 130) and a plurality of the filled closed bags are stacked in a larger airtight shipping container (step 132). The entire container is preferably evacuated in step 134 but, alternatively, the oxygen can be displaced therefrom by an inert gas.

Figure 8:
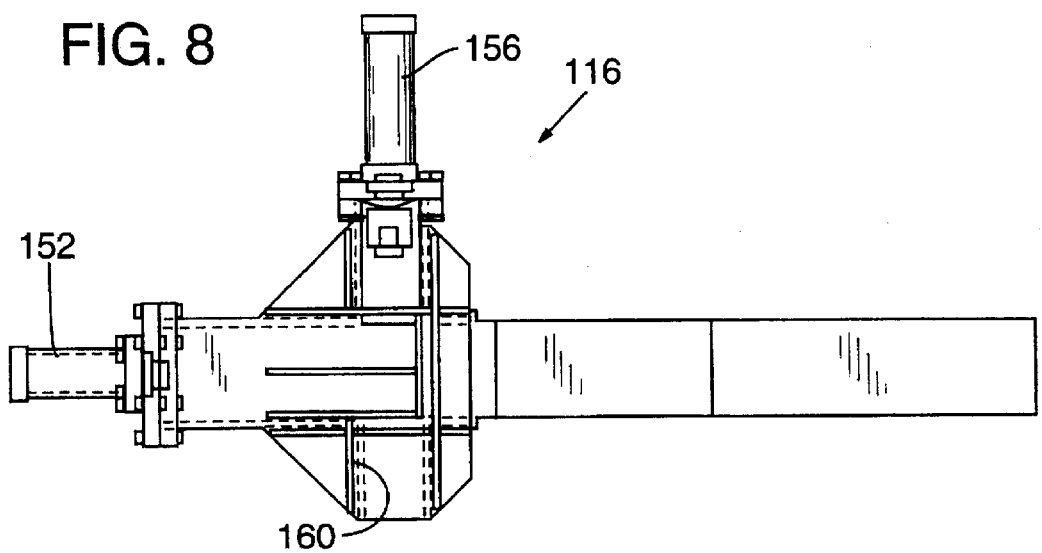
FIG. 8 is a top plan view of an alternative embodiment of compression apparatus according to the invention.
Figure 9:
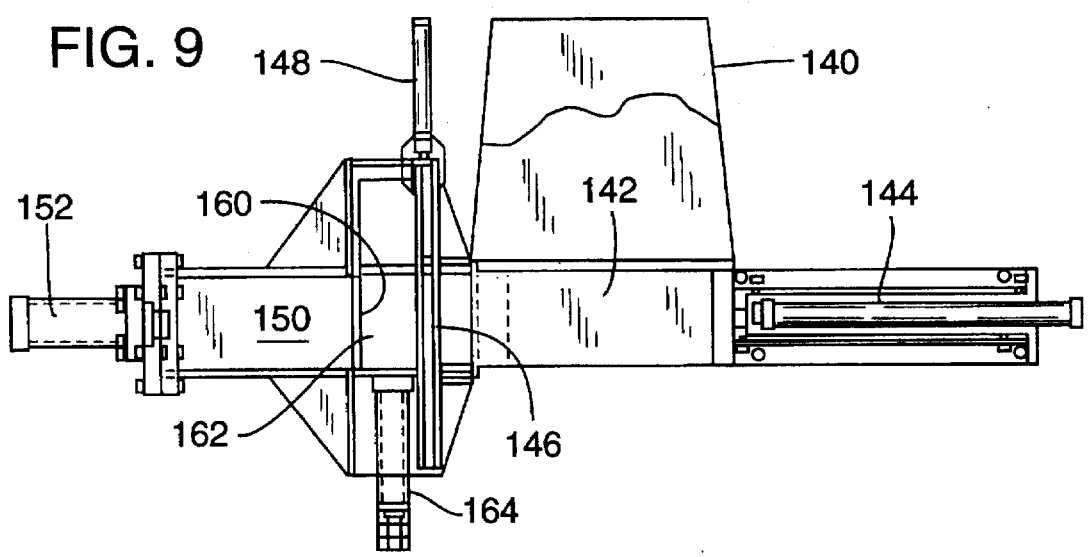
FIG. 9 is a side elevation view of the compression apparatus of FIG. 8.
Figure 10:
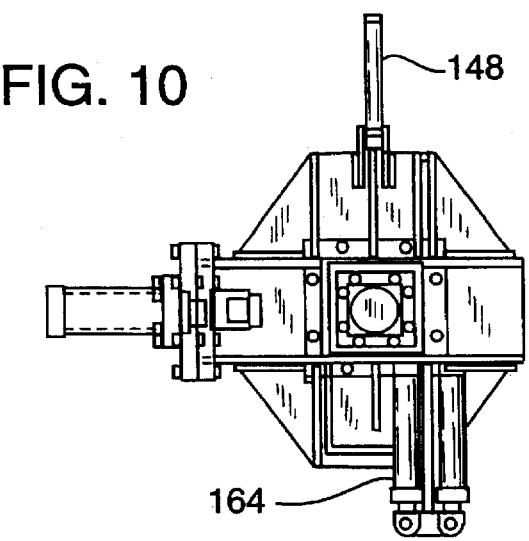
FIG. 10 is an end elevation view of the compression apparatus of FIG. 8.
Figure 12C:
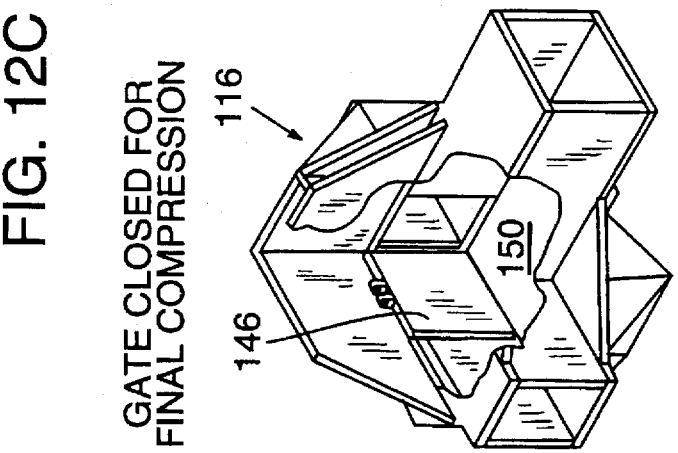
FIGS. 12A–12C are a series of perspective views similar to FIG. 11 with a portion of the side walls broken away to show interior structure, illustrating steps in the operation of the compression apparatus.
Figure 12B:
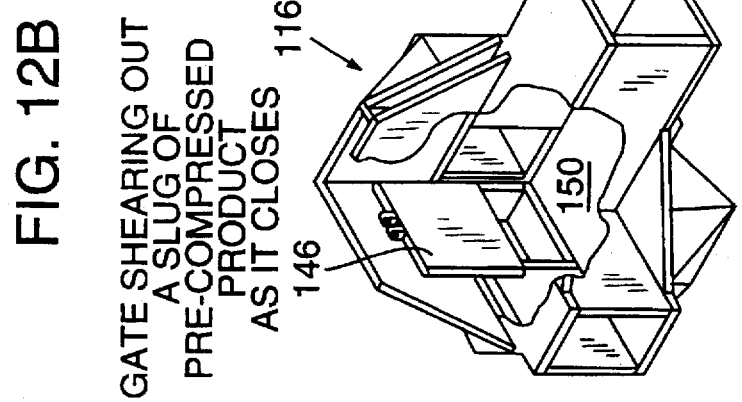
Figure 12A:
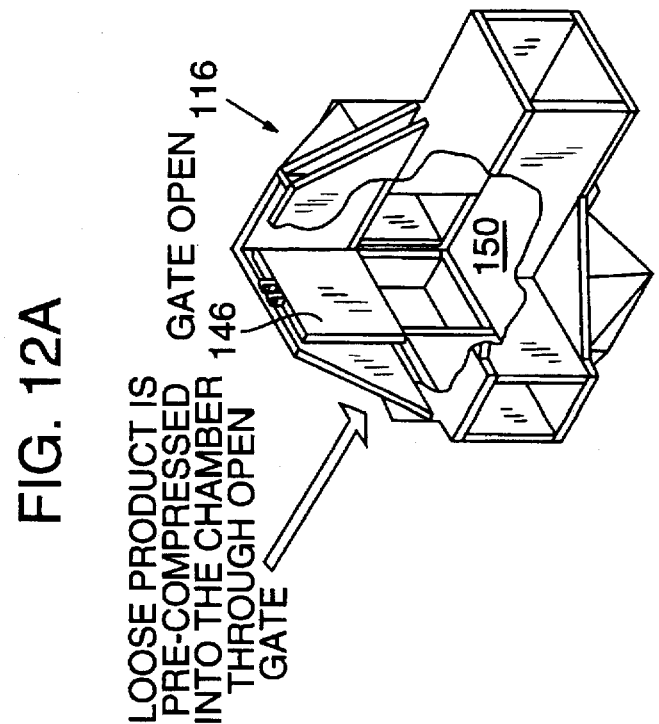

FIGS. 8–10 show a second embodiment of the compression apparatus. In this embodiment, the compression apparatus 116 resembles apparatus 16 in that it is arranged to compress the blended feed product in three stages. Rather than a gravity feed hopper and vertical pair of augers, this embodiment uses a small surge bin 140, which holds the material in sufficient amount to always fill a charging chamber 142 positioned beneath the end 140, at each stroke of a precompression ram 144. The precompression ram is oriented to operate in a horizontal direction. Mounted on its actuation rod is a pusher plate (not shown) similar to pusher plate 52, previously described. When the ram retracts, blended feed product drops into the charging chamber, and then ram 144 pushes the feed product forward. The ram pushes the feed product through an open injection gate 146, operable by actuation of ram 148, into compression chamber 150. Compression chamber 150 is collinear with the charging chamber 142 and has a main compression ram 152 mounted in opposition to precompression ram 144. During operation of precompression ram to insert the material into the compression chamber 150, the compression ram 152 pushes the material toward the main compression ram until it abuts against a pusher plate (not shown) on the main compression ram. The hydraulic circuit 166 (FIG. 14) to the precompression ram includes a pressure sensor for detecting the back pressure of the blended feed product in chamber 150. At a set pressure, the precompression ram steps. This assures that a uniform density is attained in the material precompressed in the chamber 150 during each cycle. If the precompression ram reaches the end of its travel, as determined by a position sensor, without the predetermined pressure being exceeded, the control circuitry will automatically retract to the ram to admit more material from the surge bin and then push the additional material toward chamber 150 until the predetermined pressure is attained. This step in the operation of compressor 116 is illustrated in FIG. 12A.

Figure 13:
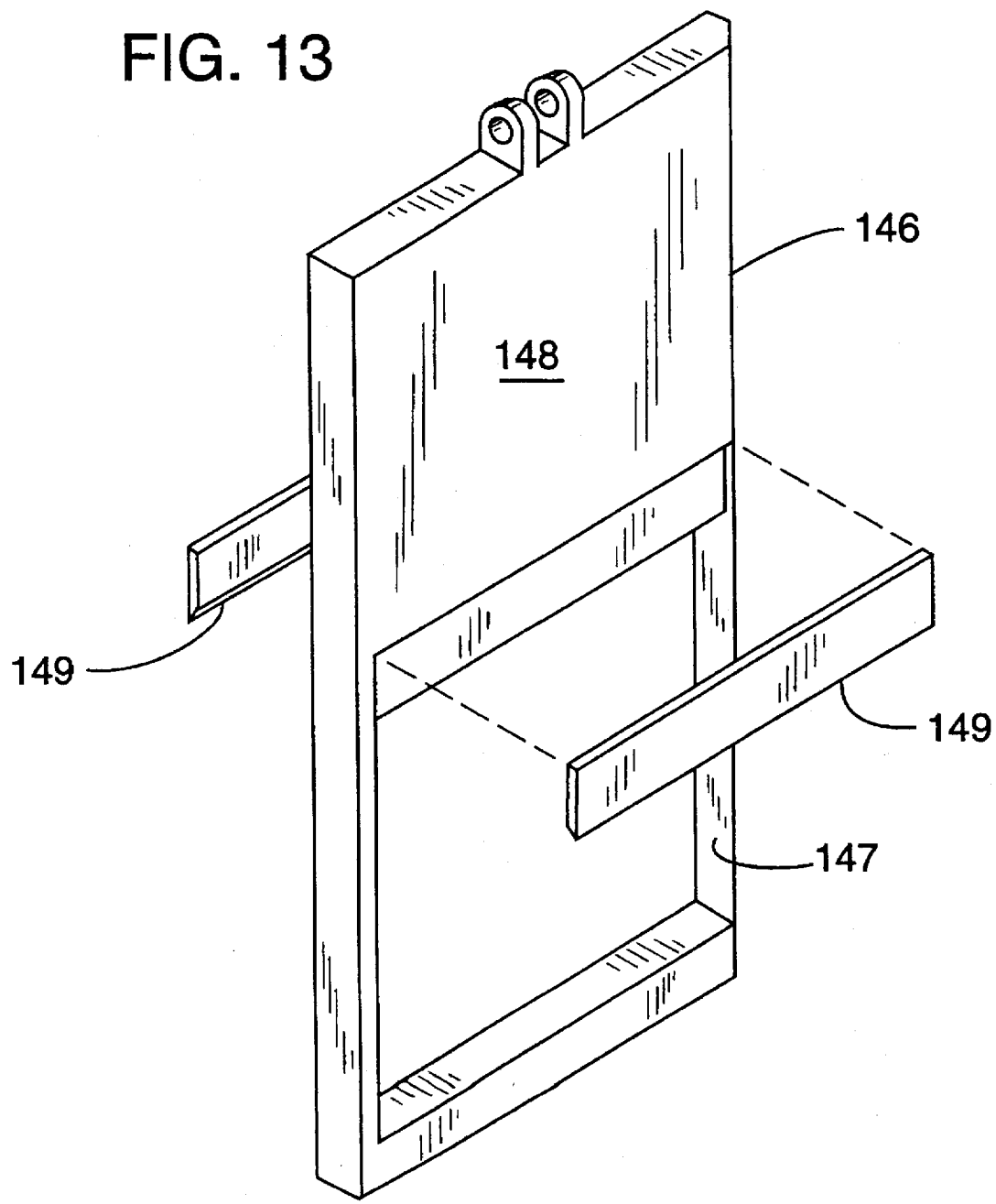
FIG. 13 is an exploded perspective view of the compression chamber first gate.

Once the preset pressure on the precompression ram control is attained, the injection gate 146 is closed by operation of ram 148. This step is shown in FIG. 12B. As shown in FIG. 13, gate 146 includes a window portion 147, through which the material is pushed from the precompression chamber 142 into compression chamber 150, and a solid, or blocking portion 148, which separates the two chambers when gate 146 is closed. Gate 146 also includes a pair of knives 149, spaced on opposite sides thereof, for shearing off the feed product as the gate 146 is closed. When the injection gate 148 closes, it seals the compression chamber opposite the main compression ram 142. The compression ram then presses the feed product toward the injection gate, substantially reducing its volume and increasing its density to about 40 pounds per cubic foot. The main compression ram preferably overcompresses the material slightly, pushing its pusher plate about ½" past the inside walls of dwell chamber 160 and then backing off to a position flush with the dwell chamber wall. In this position, the pusher plate forms a portion of the sidewall of the chamber through which ejection ram 156 operates. For actuation of the ejection ram, an ejection gate 162, actuated by a pair of rams 164, is opened to connect the compression chamber to dwell chamber 160. In this third stage, the compressed block of feed products remains through the dwell chamber for the entirety of the next succeeding cycle to allow the compressed feed product to lose some of its resilience. As the new block enters the dwell chamber, the block from the preceding cycle is forced out of the dwell chamber to a bagging apparatus.

The extremely high pressures exerted in the above-described compression apparatus subject the hydraulic rams to extreme stress. To withstand these stresses, applicant preferably uses heavy duty (HH Series) Sheffer rams with custom cylinder heads, extended cushions, and high strength tie rods, and a unitary piston/rod. Position sensors are used in all rams to control deceleration of the rod at the end of each stroke. A digital controller connected to receive signals from these sensors detects the location and rate of acceleration of the rod to dynamically adjust to varying condition, including temperature, related viscosity changes and hydraulic oil.

Figure 11:
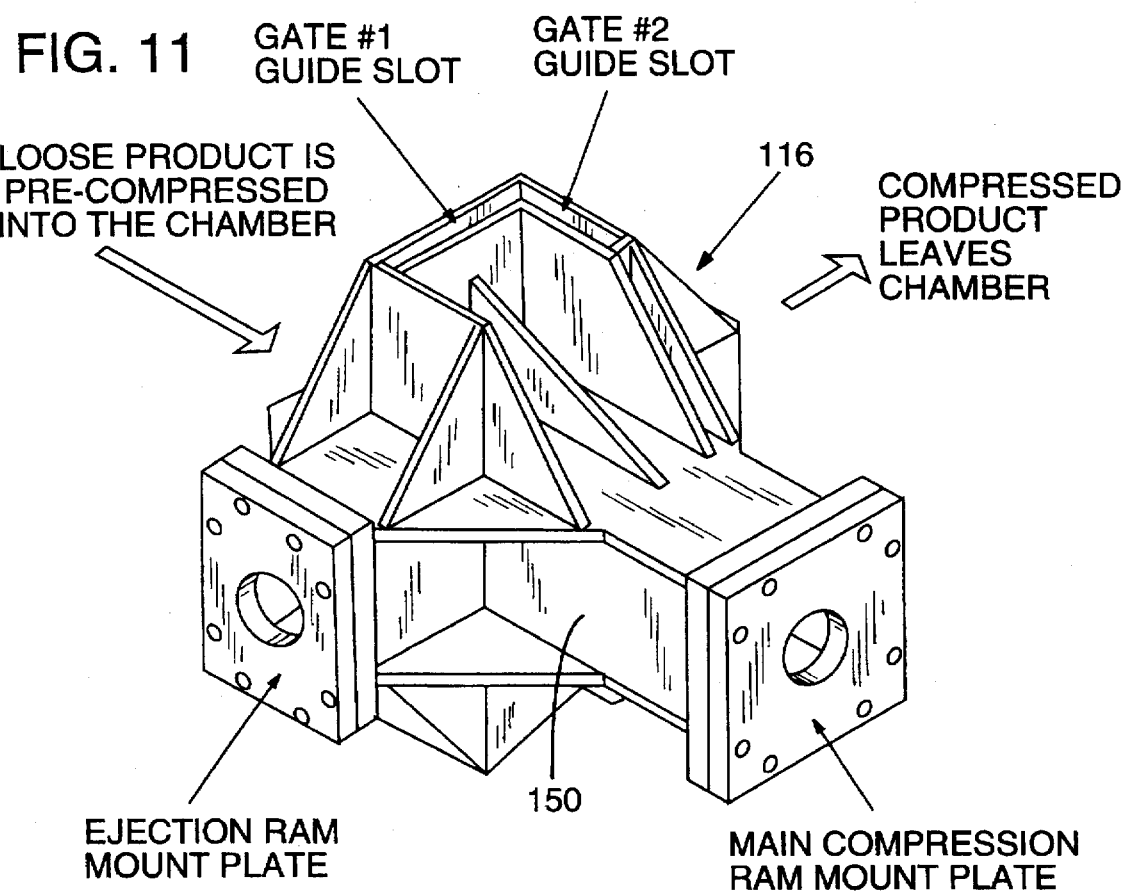
FIG. 11 is a perspective view of the compression chamber structure used in the compression apparatus of FIGS. 8–10.

The compression chamber structure must similarly withstand high stresses. The presently preferred structure of the compression chambers is shown in FIG. 11.

FIG. 14 shows the hydraulic circuitry 166 for the compressor 116. Operation of each of the gate and compression rams is controlled by a three-way valve 168, 169, operation of which is in turn controlled by a digital controller programmed to sequence the above-described operation as well as to control the individual operation of each of the rams in response to position and pressure sensor signals received during operation.

Figure 15:
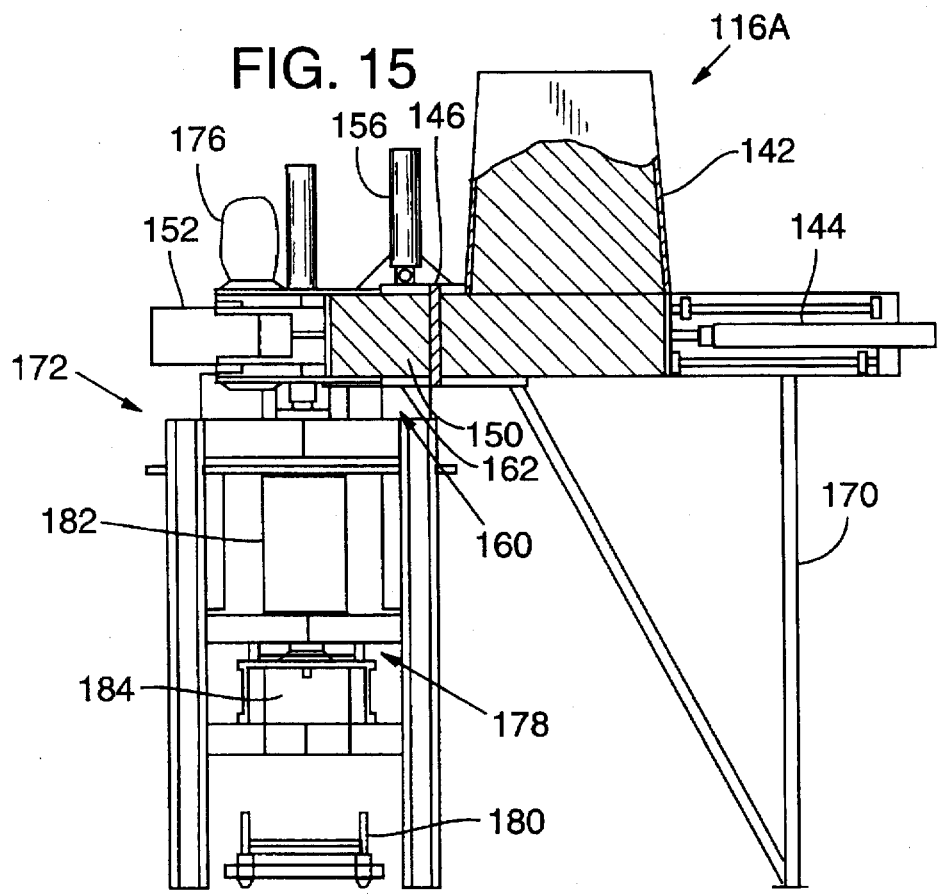
FIG. 15 is a side elevation view of the compression apparatus of FIG. 8 mounted on a stand in position to discharge blocks of high density compressed hay/silage feed product into a multistation bagger in accordance with the invention.
Figure 16:
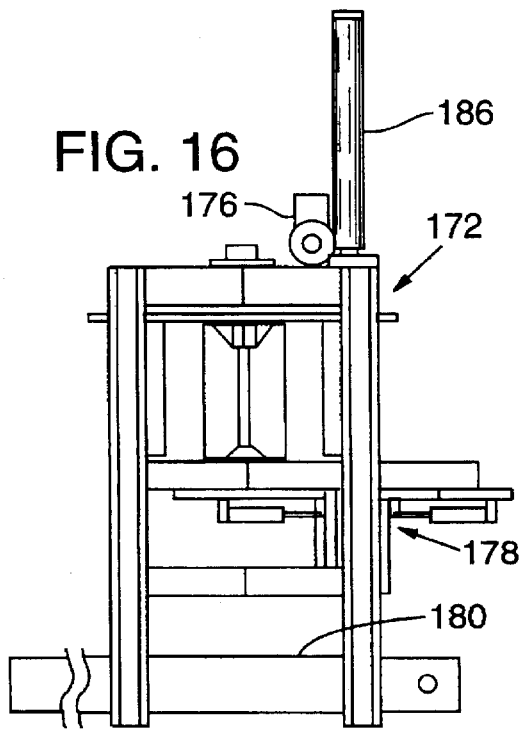
FIG. 16 is an end elevation view of the bagging apparatus of FIG. 15.

FIG. 15 shows a variation of compression apparatus 116A, in which the ejection ram 156 and dwell chamber 160 are oriented vertically. The bagging apparatus operates on the principle of a carousel-type device. It can be oriented to operate on a vertical axis, as shown in FIGS. 15–16, or can be rotated to operate on a horizontal axis to accommodate a horizontal discharge of the blocks of feed product as in the apparatus of FIG. 8.

Figure 17:
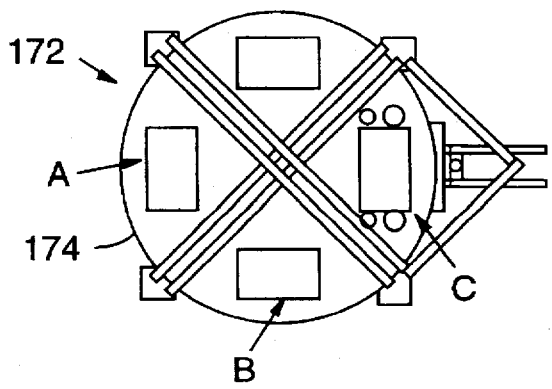
FIG. 17 is a top plan view of the bagging apparatus of FIG. 16.

Referring to FIG. 17, the bagger includes a bag placing station A, a product receiving station B, and a vacuum pack and sealing station C.

At station A, a bag is placed on the rotating platform. Once the platform has been rotated, internal and external bagging sleeves 182, 184 position the bag in station B, the block of compressed feed product is inserted by bagging ram 186 into the bag. Continuing to station C, a vacuum pump 176 evacuates the bag and a bag sealer 178 seals it to exclude substantially all oxygen from further contact with the block of compressed blended feed. At the last station the bagged feed product is released onto a conveyor 180 for movement to another location for containerization.

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A compression apparatus for compressing livestock feed comprising:

a hopper for receiving the feed;

means for precompressing the feed;

a first compression chamber coupled to the hopper to receive the precompressed feed therefrom;

gate shearing means interposed between the first compression chamber and the precompression means;

a first ram movable along a longitudinal axis of the first compression chamber and having a first pusher plate for pushing the precompressed feed along the longitudinal axis of the first compression chamber to produce a compressed block of mixed feed product;

a second, reduced volume compressed chamber operatively connected to the first compression chamber at a distal end of the first compression chamber for receiving compressed feed pushed from the first compression chamber by the first pusher plate, wherein the first pusher plate defines one side of the second compression chamber when the first ram is fully extended, the second compression chamber having an opening at one end thereof for discharging the compressed feed; and a second ram movable along a longitudinal axis of the second compression chamber, the second ram having a second pusher plate for pushing the compressed blocked of mixed feed product along the longitudinal axis of the second compression chamber.

\* \* \* \* \*

UNITED STATES PATENT AND TRADEMARK OFFICE
CERTIFICATE OF CORRECTION

PATENT NO. : 5,689,941
DATED : November 25, 1997
INVENTOR(S) : John M. Gombos; Moshe Leashno; James Alan Cooper; Jeffrey Kay Cooper; Lawrence Kay Cooper; Daniel Leroy Peterson It is certified that error appears in the above-identified patent and that said Letters Patent is hereby corrected as shown below:   ON THE TITLE PAGE:

Item 54, in the title change "APPARTUS" to -- APPARATUS --.
Column 1, line 3, in the title change "APPARTUS" to -- APPARATUS --.
Column 1, line 37, change "cost it" to -- cost is --.
Column 2, line 53, change "beth" to -- both --.
Column 3, line 16, after "vitamins" insert a comma.
Column 3, line 45, after "that is" insert -- in --.
Column 3, line 57, change "densities" to -- densifies --.
Column 4, line 23, change "metro" to -- meter --.
Column 4, line 31, after "chamber" delete "and"
Column 7, line 22, after "that is" insert -- in --.
Column 8, line 35, change "steps" to -- stops --.
Column 10, line 30, change "compressed" to -- compression --.

Signed and Sealed this

Twenty-seventh Day of October, 1998

*Attest:*

BRUCE LEHMAN

*Attesting Officer*   Commissioner of Patents and Trademarks